United States Patent
Liu et al.

(10) Patent No.: US 7,132,638 B2
(45) Date of Patent: Nov. 7, 2006

(54) CCD IMAGING ARRAY WITH IMPROVED CHARGE SENSING CIRCUIT

(75) Inventors: Xinqiao Liu, San Jose, CA (US); David D. Wen, Los Altos, CA (US); Anh N. Vu, Saratoga, CA (US); Steven Kiyoshi Onishi, San Jose, CA (US); Charles J. Arduini, Santa Clara, CA (US)

(73) Assignee: Fairchild Imaging, Milpitas, CA (US)

( * ) Notice: Subject to any disclaimer, the term of this patent is extended or adjusted under 35 U.S.C. 154(b) by 84 days.

(21) Appl. No.: 10/866,537

(22) Filed: Jun. 10, 2004

(65) Prior Publication Data

US 2005/0274873 A1    Dec. 15, 2005

(51) Int. Cl.
*H01L 27/00* (2006.01)
*H04N 3/14* (2006.01)

(52) U.S. Cl. .................... 250/208.1; 348/301

(58) Field of Classification Search ......... 250/208.1, 250/281; 348/301, 302, 303, 304, 308, 241
See application file for complete search history.

(56) References Cited

U.S. PATENT DOCUMENTS

| | | |
|---|---|---|
| 4,556,910 A * | 12/1985 | Tisue .................. 348/241 |
| 5,461,425 A | 10/1995 | Fowler et al. |
| 5,771,070 A * | 6/1998 | Ohzu et al. .......... 348/241 |
| 6,339,363 B1 | 1/2002 | Fowler |
| 6,424,375 B1 | 7/2002 | Fowler |
| 6,459,078 B1 | 10/2002 | Fowler |
| 6,515,701 B1 * | 2/2003 | Clark et al. .......... 348/308 |
| 6,614,312 B1 | 9/2003 | Fowler |
| 6,757,018 B1 | 6/2004 | Fowler |
| 6,885,331 B1 * | 4/2005 | Krymski .............. 341/169 |
| 2004/0195491 A1 * | 10/2004 | Machida ............. 250/208.1 |

* cited by examiner

*Primary Examiner*—Georgia Epps
*Assistant Examiner*—Don Williams
(74) *Attorney, Agent, or Firm*—Calvin B. Ward

(57) ABSTRACT

An imaging array having a CCD imaging array that includes a plurality of pixels that accumulate charge when exposed to light and a readout amplifier is disclosed. The readout amplifier includes an operational amplifier having an input and an output port and a feedback capacitor connecting the input and output ports and a variable impedance path between the input and output ports, the path having an impedance controlled by a reset signal. A reset signal generator generates the reset signal in three sequential phases in which the path between the input and output ports has three impedance values to provide a starting voltage at the amplifier input prior to the measurement of charge from each pixel that has reduced noise.

7 Claims, 3 Drawing Sheets

CCD IMAGING ARRAY WITH IMPROVED CHARGE SENSING CIRCUIT

BACKGROUND OF THE INVENTION

The present invention may be more easily understood in the context of low light imaging arrays such as those used in digital photography to record an image. For the purposes of this discussion, an image will be defined as a two-dimensional array of digital values that represent the amount of light received during an exposure period at each pixel on a two-dimensional surface onto which the image is projected. For the purposes of this discussion, it will be assumed that each pixel is a small rectangular area on that surface. In digital photography, the image is projected onto an imaging array in which each pixel includes a photodetector that measures the amount of light that falls on some portion of the pixel area.

The quality of the image is set by the signal to noise ratio at each pixel. The signal is proportional to the number of photons that were converted to electrons at that pixel. As the light levels in the image decrease, i.e., low light applications, the number of available photons at each pixel eventually becomes the limiting factor. If the number is too low, each pixel will have "statistical noise" that is approximately equal to the square root of the number of photons that were converted to electrons. Hence, the pixel parameters must be chosen to assure that a sufficient number of photons are converted at each pixel location.

The ratio of the portion of each pixel in which the light is converted to electrons to the total pixel area is referred to as the "fill factor". The number of photons converted at each pixel depends on the exposure time, the pixel area, the fill factor, and the probability that a photon striking the active part of the pixel actually generates an electron that is captured by the photodetector. There is an upper limit on the exposure time that is set by the scene being imaged. The exposure time must be sufficiently small to "freeze" any motion in the scene. The area of a pixel is likewise constrained by the degree of resolution required in the image, since large pixel areas lead to grainy images. The probability that a photon will be converted to an electron is a property of the material from which the array is constructed, and hence, is not easily changed. Accordingly, imaging arrays having large fill factors are preferred for low light applications.

In one class of imaging array, the detector utilizes an area of silicon to collect electrons that are generated by light that strikes the silicon. During the exposure period, the electrons accumulate in the pixel area. The charge collected in each pixel area is measured at the end of the exposure period by moving the charge to an amplifier and an analog-to-digital converter that provides a digital value for each pixel. The pixels are arranged as a plurality of columns of pixels. Each pixel in a column is part of an analog shift register. The image is readout by shifting the charge collected at each pixel through the shift register until it reaches the end of the column. The charge is then either input to an amplifier or moved to another shift register that finally deposits the charge at the amplifier. Imaging arrays of this type are often referred to as charge-coupled devices (CCDs). CCDs are characterized by large fill factors, since most of the area of each pixel is devoted to generating and storing electrons from the incident light, and hence, such devices have the potential for providing imaging arrays that can operate under low light conditions.

However, other sources of noise degrade the performance of these devices. Since the individual pixels have no amplification circuitry at the pixel, the small charge signals must be moved relatively long distances to the readout amplifiers that are shared by a large number of pixels. The amplifier may be viewed as having a capacitor that is charged by the charge collected by the pixel that is currently being processed. The capacitor must be reset to a known voltage level prior to receiving the charge in question. The charge is then transferred to the amplifier and the voltage across the capacitor is amplified and digitized. Any error in the voltage to which the capacitor is reset between charge measurements contributes to the noise in the measured values. In low light applications, the available charge is already small, and hence, this noise source can limit the performance of the imagining array.

SUMMARY OF THE INVENTION

The present invention includes an imaging array having a CCD imaging array that includes a plurality of pixels that accumulate charge when exposed to light and a readout amplifier. The readout amplifier includes an operational amplifier having an input and an output port and a feedback capacitor connecting the input and output ports and a variable impedance path between the input and output ports, the path having an impedance controlled by a reset signal. The imaging array also includes a reset signal generator that generates the reset signal having three sequential phases in which the path between the input and output ports has three impedance values. The first impedance is greater than the second impedance. The third impedance is greater than a cut-off impedance. A shift register sequentially shifts the charge accumulated by each pixel into the input port of the amplifier. The reset signal generator applies the reset signal prior to each charge being shifted into the input port. In one embodiment, the variable impedance path includes a transistor having a source and drain connected respectively to the input and output ports, and the first phase includes a signal having an amplitude sufficient to cause the transistor to provide a path having an impedance that is less than ten thousand ohms. In one embodiment, the second phase includes a continuously changing potential from the amplitude of the first signal to a potential that causes the transistor to have an impedance greater than the cut-off impedance. In one embodiment, the feedback capacitor includes a capacitor array having a first node connected to the input port and a second node connected to the output port. The capacitor array includes a plurality of capacitors in which each capacitor has a capacitance that is greater than the capacitance between the first and second nodes. In one embodiment, the imaging array also includes first and second sample and hold circuits. The first sample and hold circuit records the potential at the output port at the end of the third phase but before the charge is shifted into the input port. The second sample and hold circuit records the potential at the output port after the charge is shifted into the input port. A subtraction circuit subtracts the potentials recorded by the first and second sample and hold circuits to provide a signal indicative of the charge input to the readout amplifier.

DETAILED DESCRIPTION OF THE PREFERRED EMBODIMENTS OF THE INVENTION

Figure 1:
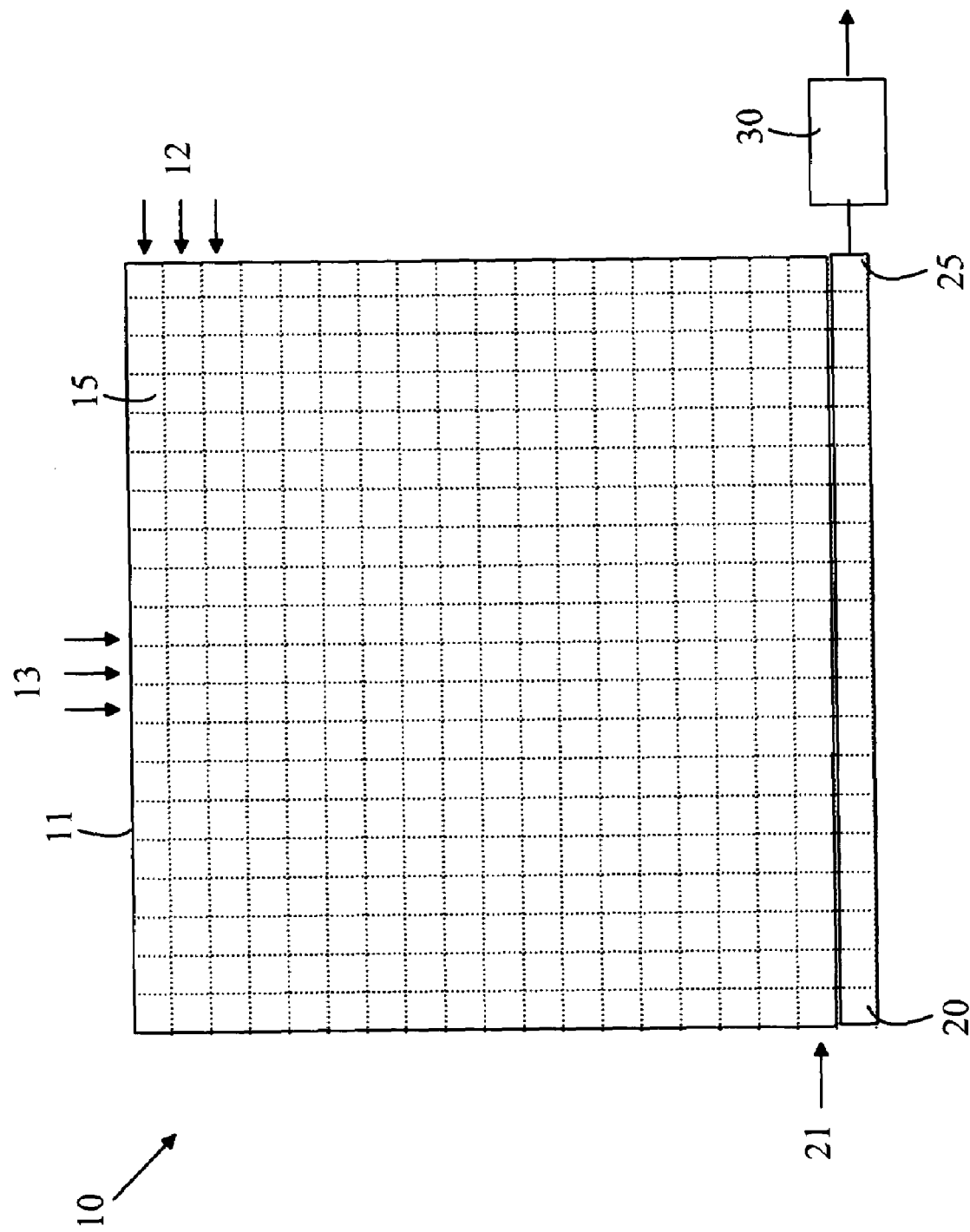
FIG. 1 illustrates a CCD imaging sensor according to one embodiment of the present invention.

The manner in which the present invention provides its advantages can be more easily understood with reference to FIG. 1, which illustrates a CCD imaging sensor according to one embodiment of the present invention. Image sensor 10 includes a photodetector array 11 in which the individual photodetectors 15 are organized as a plurality of rows 12 and columns 13. In addition, the columns can be operated as shift registers to move charge stored in the various photodetectors after the array is exposed to an image to a shift register 20. On each column shift operation, the contents of the photodetectors in row 21 are shifted into register 20, and the contents of each column are moved downward toward shift register 20. The contents of shift register 20 are then shifted horizontally into an output amplifier 30 that converts the charge in cell 25 to an output voltage. To simplify the drawing the various electrodes used in the shifting operations and the clock circuitry have been omitted from FIG. 1. This circuitry will be discussed in more detail below.

In the following discussion, a pixel readout cycle is the cycle in which the charge from one pixel in photodetector array 11 is converted to a voltage or digital value that specifies the amount of charge that was delivered to output amplifier 30. In one preferred embodiment of the present invention, output amplifier 30 is located on a separate substrate from the photodetector array so that conventional CMOS semiconductor processing can be used to fabricate the amplifier and the associated processing circuitry.

Figure 2:
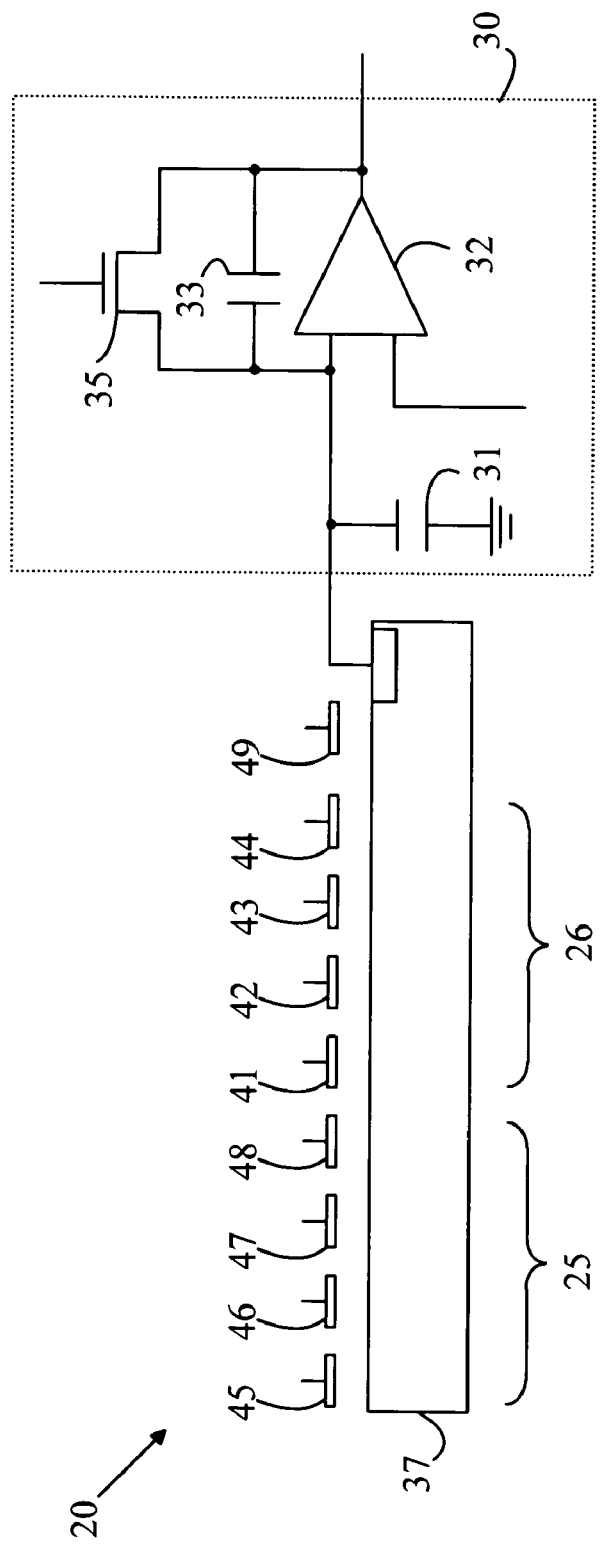
FIG. 2 illustrates the output end of the shift register and output amplifier.

Refer now to FIG. 2, which illustrates the output end of shift register 20 and output amplifier 30 in a four-phase CCD. The manner in which charge is shifted along shift register 20 is known to the art, and hence, will not be discussed in detail here. For the purposes of this discussion, it is sufficient to note that each cell in shift register 20 includes an area of silicon in which the charge moves and 4 electrodes that set the potential in the silicon area. Two such cells are shown at 25 and 26. The electrodes over the silicon area 37 of cell 26 are shown at 41–44. At the start of a shift cycle, the electrodes 41 and 44 are at potentials that contain the charge in the region under electrodes 42 and 43. To move the charge into amplifier 30, the potential at electrode 42 is altered to force the charge into the region under electrode 44. The potential on electrodes 44 and 49 is then altered to allow the charge to escape onto capacitor 31 at the input to operational amplifier 32. The potential on electrodes 43 and 44 are then sequentially altered to force the charge under these electrodes to move onto capacitor 31. It should be noted that the potential on electrode 49, which acts as an output gate, is maintained at a constant potential except when charge is to be transferred to capacitor 31. This output gate reduces clock coupling between the other electrodes and capacitor 31.

During the shift operation, the potentials on electrodes 45–48 associated with cell 25 are likewise manipulated to force the charge in that cell into cell 26. For example, when the potential on electrode 42 is altered to force charge under that electrode to the area under electrode 43, electrode 41 is no longer needed to contain the charge within cell 26. Hence, the potential on this electrode can be altered to allow charge from cell 25 to move under electrode 41. Similarly, when the potential on electrode 43 is altered to move the charge under electrode 44, the potential on electrode 42 is no longer needed to separate the charge in cells 25 and 26, and hence this electrode's potential can be altered to allow the charge from cell 25 to move under that electrode. The potential on the electrodes in cell 25 can then be altered to force the remaining charge from cell 25 to move under electrode 43 thereby completing the shifting of the charge from cell 25 to cell 26 while the charge from cell 26 was shifted onto capacitor 31.

As noted above, prior to the charge from cell 26 being shifted onto capacitor 31, the potential across this capacitor must be set to a predetermined value. This is accomplished by applying a reset control signal to transistor 35, which couples capacitor 31 to the output operational amplifier 32, which is held at the reset potential during this operation. Once the potential on capacitor 31 has been set, transistor 35 is set to the non-conducting state thereby isolating capacitor 31. When the charge from cell 26 is shifted onto capacitor 31, it alters the voltage at the input to operational amplifier 32, and hence, operational amplifier 32 converts the charge to a voltage value that can then be digitized to provide the intensity value corresponding to the pixel in which the charge was originally generated.

It should be noted that any variation in the reset voltage on capacitor 31 is translated into an error in the pixel intensity value, since the starting value for the potential on the capacitor will be altered. Hence, noise at the output of amplifier 32 during the reset period is translated into noise in the signal values. In low light applications, such noise can constitute a significant fraction of the noise in the measured pixel intensity values, and hence, reduce the signal-to-noise ratio in the image to unacceptable levels.

The noise levels on capacitor 31 depend on the bandwidth of the reset path. If the bandwidth of the reset path is small, noise spikes on the reset line to which the output of amplifier 32 is connected will be filtered out, and hence, the noise will be reduced. In effect, the resistance of transistor 35 and the capacitance of capacitor 31 form an RC filter that filters out the noise spikes. Hence, in principle, the reset noise can be substantially reduced by maintaining transistor 35 in a high resistance state during the reset operation.

Unfortunately, resetting capacitor 31 through such a low bandwidth path would increase the reset time to an unacceptable value. Amplifier 30 must process the charge collected by a very large number of pixels, one pixel at a time. Hence, the time available for processing each charge is relatively small. Since the reset time is a significant part of the total processing time for each pixel, there is a very limited period of time available for resetting the amplifier between charge measurements.

The present invention overcomes this problem by breaking the reset time into two intervals. In the first time interval, a relatively high bandwidth path is used to reset the voltage at the amplifier input to a state that is close to the final state. The input to the amplifier is then connected to a low bandwidth path that provides the final adjustment in the input voltage. Since the capacitor at the input to the amplifier is close to the final voltage at the end of the first time period, the amount by which the voltage needs to be changed to arrive at the final reset value is small enough that this voltage change can be provided through a low bandwidth path. Hence, the reset noise is substantially reduced while maintaining a short reset time.

Figure 3:
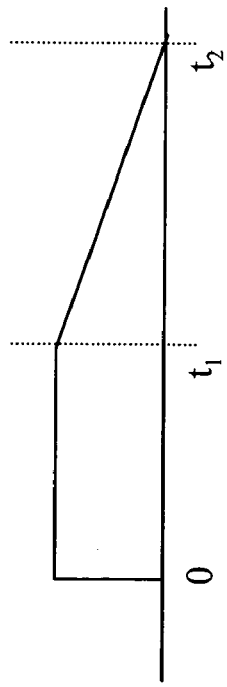
FIG. 3 illustrates the reset potential that is applied to the reset transistor during the reset period prior to each charge measurement.

Refer now to FIG. 3, which illustrates the reset potential that is applied to transistor 35 during the reset period prior to each charge measurement. As noted above, the bandwidth of the reset circuitry is set by adjusting the impedance of reset transistor 35 during the reset period. Initially, the reset signal that is applied to transistor 35 is set to a value that provides a low resistance during the time period from 0 to $t_1$. This impedance is typically less than 10,000 ohms. After the first time period has elapsed, the reset signal is ramped back to zero over a second time period $t_2$. During this second time period, the impedance of reset transistor 35 increases and, hence, the bandwidth of the reset path is continuously decreased. After the reset operation, reset transistor 35 is placed in a high impedance state that effectively turns off the transistor. It is sufficient to note that this high impedance state need only provide an impedance that is sufficient to assure that any leakage through transistor 35 is small compared to the amount of charge that is transferred to the amplifier for the smallest signal that is to be read from a pixel. In general, the imaging array will be designed to detect light above some minimum level. For example, the impedance of reset transistor 35 can be set such that the charge that leaks through the reset transistor during the time the amplifier is processing a signal from a pixel is less than ten percent of the charge that is generated by a pixel that is exposed to the lowest light level that the imaging array is designed to detect. This impedance will be referred to as the cut-off impedance in the following discussion.

While the embodiment shown above continually increases the impedance of reset transistor 35 during the second phase, embodiments in which this impedance is set at a constant value that is greater than the impedance during the first phase can also be utilized.

In the above-described embodiments of the present invention, the feedback capacitor 33 has been shown as a single capacitor. Denote the feedback capacitance value by $C_f$ and the capacitance of capacitor 31 by $C_i$. The gain of amplifier 30 is proportional to $C_i/C_f$. Hence, to provide the high gain needed to deal with low light levels, $C_f << C_i$. $C_i$ is determined by the parasitic value inherent in the pixel size and connection circuitry, and hence, has a minimum value that cannot be easily changed. Accordingly, $C_f$ must be made small to provide the desired gain. Unfortunately, there is also a limit to the size of a single capacitor that can be reproducibly implemented in an integrated circuit process.

Figure 4:
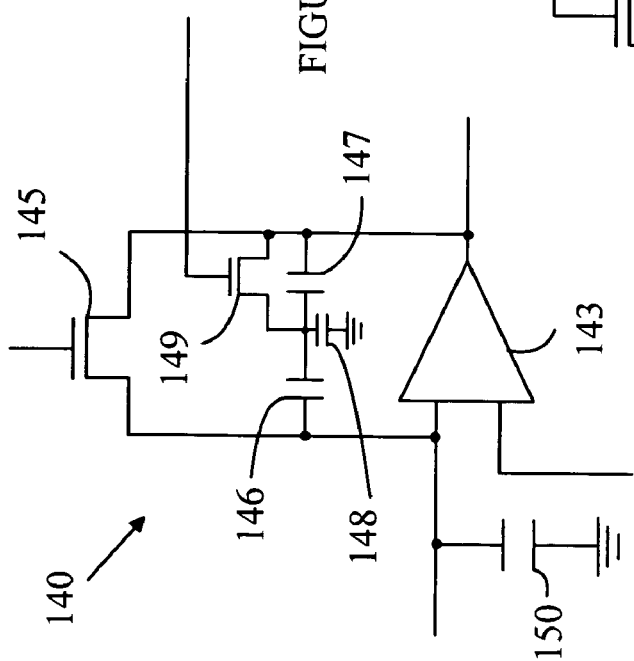
FIG. 4 is a schematic drawing of an output amplifier that utilizes a network of capacitors constructed from capacitors that are large enough to be reproducibly fabricated.

In one embodiment of the present invention, this problem is overcome by replacing the feedback capacitor with a network of capacitors constructed from capacitors that are large enough to be reproducibly fabricated. The capacitors are chosen such that the network has a capacitance that is small compared to $C_i$. Refer now to FIG. 4, which is a schematic drawing of an output amplifier 140 that utilizes such a network. Amplifier 140 is a capacitive transimpedance amplifier constructed from an opamp 143 and a capacitive network consisting of capacitors 146–148 whose capacitances will be denoted by $C_1$–$C_3$, respectively, in the following discussion. Reset switches 145 and 149 short the capacitors prior to transferring charge to capacitor 150. The capacitance of the network is $C_3C_1/(C_1+C_2+C_3)$. Hence, if $C_3$ and $C_1$ are about the same size as $C_i$, i.e., $C_1=C_3=C_i$ and $C_2=G*C_i$, where $G>>1$, the resulting network will have a capacitance that is approximately $C_i/G$, and all of the capacitors will be of a size that can be reproducibly fabricated. The reset switches are preferably operated such that switch 149 closes prior to switch 145. This order of operation minimizes the effects of the noise generated by the electrons leaving the transistors when the state of the switches changes. The voltage to reset transistor 145 is ramped during the reset cycle as discussed above. The voltage to reset transistor 149 does not need to be ramped to reduce the reset noise.

Figure 5:
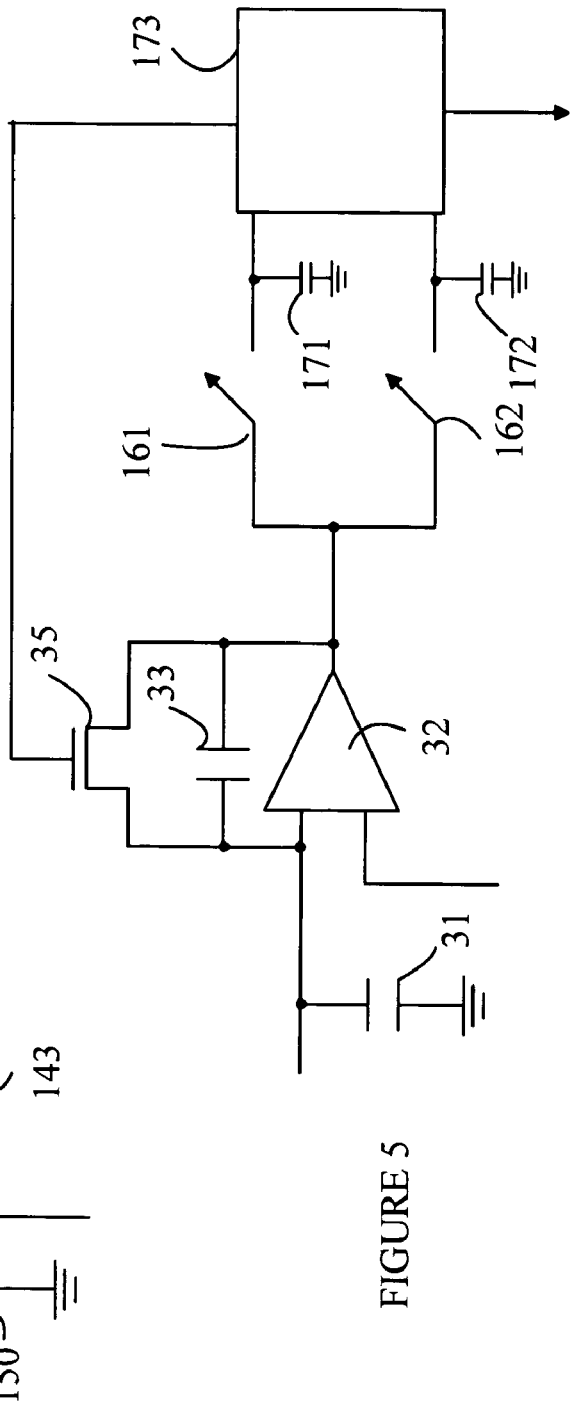
FIG. 5 illustrates an embodiment of the present invention that utilizes double sampling.

The reset noise can be further reduced by recording the output of the amplifier after the input has been reset and subtracting the recorded value from the amplifier output after the charge has been coupled to the amplifier input. Refer now to FIG. 5, which illustrates an embodiment of the present invention that utilizes such double sampling. To simplify the following discussion, those elements that serve functions analogous to elements discussed above have been given the same numeric designations and will not be discussed further here. During the reset cycle, both switches 161 and 162 are closed and output circuit 173 provides the reset voltage. In addition, output circuit 173 provides the reset voltage profile discussed above with reference to transistor 35 in FIG. 2. At the end of the reset period, switch 162 is opened thereby leaving the initial output value from amplifier 32 stored on capacitor 172. After the charge has been transferred to the input of amplifier 32 and the output of amplifier 32 has settled, switch 161 is opened leaving the amplifier output value stored on capacitor 171. Output circuit 173 then subtracts the voltage on the capacitor 172 from that on capacitor 171 to provide the pixel output. Output circuit 173 can also include the other logic needed to sequentially shift the charge from the various pixels into the output shift register 20 from the columns of pixels in the CCD array. To simplify the drawings, the connections between output circuit 173, the various electrodes in the CCD array, and the output shift register have been omitted.

The above-described embodiments of the present invention have been described in terms of a reset switch that provides a variable impedance path between the input and output ports of the operational amplifier. However, any variable impedance path can be utilized for this function provided the path can be adjusted to provide paths of different bandwidths and provided that the path can be effectively turned off while the amplifier is amplifying the signal generated by the charge from each pixel. For the purposes of this discussion, the path will be deemed to be non-conducting if the impedance of the path is sufficient to prevent a charge of 0.1 times the minimum charge from a pixel that has been exposed to light from moving between the input and output ports of the operational amplifier during the time in which the charge from a pixel is measured.

The embodiments of the present invention described above utilize a four-phase CCD shift register structure. However, the present invention can be utilized with other CCD structures such as two-phase and three-phase shift registers.

Various modifications to the present invention will become apparent to those skilled in the art from the foregoing description and accompanying drawings. Accordingly, the present invention is to be limited solely by the scope of the following claims.

What is claimed is:

1. An imaging array comprising:
   a CCD imaging array comprising a plurality of pixels that accumulate charge when exposed to light;
   a readout amplifier comprising
   an operational amplifier having an input and an output port and a feedback capacitor connecting said input and output ports;

a variable impedance path between said input and output ports, said path having an impedance controlled by a reset signal;

a reset signal generator that generates said reset signal, said reset signal having three sequential phases, a first phase in which said path has a first impedance, a second phase in which said path has an impedance greater than a second impedance, and a third phase in which said path has an impedance greater than a cut-off impedance, said second impedance being greater than said first impedance; and a shift register that sequentially shifts said charge accumulated by each pixel into said input port, said reset signal generator applying said reset signal prior to each charge being shifted into said input port, wherein said readout amplifier generates an output indicative of said charge shifted into said input pert during said third phase.

2. The imaging array of claim 1 wherein
said variable impedance path comprises a transistor having a source and drain connected respectively to said input and output ports, and wherein said first phase comprises a signal having an amplitude sufficient to cause said transistor to provide a path having an impedance that is less than ten thousand ohms.

3. The imaging array of claim 2 wherein said second phase comprises a continuously changing potential from said amplitude of said first signal to a potential that causes said transistor to have an impedance greater than said cut-off impedance.

4. The imaging array of claim 1 wherein said feedback capacitor comprises a capacitor array having a first node connected to said input port and a second node connected to said output port, said capacitor array comprising a plurality of capacitors in which each capacitor has a capacitance that is greater than the capacitance between said first and second nodes.

5. The imaging array of claim 1 further comprising a first sample and hold circuit for recording a potential at said output port at the end of said third phase but before said charge is shifted into said input port;

a second sample and hold circuit for recording a potential at said output port after said charge is shifted into said input port;

a subtraction circuit for subtracting said potentials recorded by said first and second sample and hold circuits.

6. A method for reading out a CCD imaging array comprising a plurality of pixels that accumulate charge when exposed to light, said imaging array including a readout amplifier having an operational amplifier having an input and an output port and a feedback capacitor connecting said input and output ports; and a variable impedance path between said input and output ports, said path having an impedance controlled by a reset signal, said method comprising:

causing said variable impedance path to provide a first impedance for a first period of time;

causing said variable impedance path to provide a second impedance for a second period of time;

causing said variable impedance path to provide a third impedance for a third period of time;

inputting said charge from one of said pixels into said input port during said third period of time;

measuring a signal at said output port during said third period of time, wherein said first impedance is less than said second impedance and wherein said third impedance is greater than a cut-off impedance.

7. The method of claim 6 further comprising recording a first potential at said output port at the end of said second period of time;

recording a second potential at said output port after said charge is shifted into said input port; and subtracting said first and second potentials.

* * * * *